US012805523B2

(12) United States Patent
Haines et al.

(10) Patent No.: US 12,805,523 B2
(45) Date of Patent: Nov. 24, 2026

(54) FUNGICIDAL COMPOSITION COMPRISING PROTHIOCONAZOLE AND AT LEAST ONE WEAK ACID

(71) Applicants: UPL Corporation Limited, Port Louis (MU); UPL Europe LTD, Warrington (GB)

(72) Inventors: Robbie Haines, Port Louis (MU); Charlie James Flood, Port Louis (MU)

(73) Assignees: UPL CORPORATION LIMITED, Port Louis (MU); UPL EUROPE LTD, Warrington (GB)

( * ) Notice: Subject to any disclaimer, the term of this patent is extended or adjusted under 35 U.S.C. 154(b) by 780 days.

(21) Appl. No.: 17/920,869

(22) PCT Filed: Apr. 22, 2021

(86) PCT No.: PCT/GB2021/050961

§ 371 (c)(1),
(2) Date: Oct. 24, 2022

(87) PCT Pub. No.: WO2021/214463

PCT Pub. Date: Oct. 28, 2021

(65) Prior Publication Data

US 2023/0180753 A1 Jun. 15, 2023

(30) Foreign Application Priority Data

Apr. 24, 2020 (GB) ..................................... 2006033

(51) Int. Cl.
*A01N 43/653* (2006.01)
*A01N 25/12* (2006.01)
(Continued)

(52) U.S. Cl.
CPC ........... *A01N 43/653* (2013.01); *A01N 25/12* (2013.01); *A01N 25/22* (2013.01); *A01N 25/30* (2013.01); *A01N 43/54* (2013.01); *A01N 43/56* (2013.01)

(58) Field of Classification Search
CPC ...... A01N 43/653; A01N 25/12; A01N 25/22; A01N 43/54
See application file for complete search history.

(56) References Cited

U.S. PATENT DOCUMENTS

2011/0166309 A1 7/2011 Koltzenburg et al.
2011/0207607 A1 8/2011 Satchivi et al.
2014/0221440 A1 8/2014 Iwata et al.

FOREIGN PATENT DOCUMENTS

CN 101828564 B 3/2013
CN 103168785 * 3/2013 ............. A01N 37/50
(Continued)

OTHER PUBLICATIONS

English translation of CN103168785 (Year: 2013).*
(Continued)

*Primary Examiner* — San Ming R Hui
(74) *Attorney, Agent, or Firm* — CANTOR COLBURN LLP

(57) ABSTRACT

The present invention relates to a stable fungicidal composition comprising at least one conazole fungicide and at least one weak acid. In particular, the present invention provides a composition comprising a conazole fungicide, a weak acid and water in the form of water dispersible granules. The present invention further provides a process of preparation of fungicidal composition, its use and method of application of fungicidal compositions for pest control.

11 Claims, 2 Drawing Sheets

(51) Int. Cl.
*A01N 25/22* (2006.01)
*A01N 25/30* (2006.01)
*A01N 43/54* (2006.01)
*A01N 43/56* (2006.01)

(56) References Cited

FOREIGN PATENT DOCUMENTS

| | | | | | |
|---|---|---|---|---|---|
| WO | WO-2015032692 | A1 | * | 3/2015 | ............. A01N 37/50 |
| WO | 2020061706 | A1 | | 9/2019 | |
| WO | 2020074364 | A1 | | 4/2020 | |

OTHER PUBLICATIONS

English translation of WO 2015/032692 (Year: 2015).*

International Search Repor and Written Opinion for International Application PCT/GB2021/050961; International Filing Date: Apr. 22, 2021; Date of Mailing: Jul. 2, 2021; 11 pages.

* cited by examiner

FUNGICIDAL COMPOSITION COMPRISING PROTHIOCONAZOLE AND AT LEAST ONE WEAK ACID

CROSS REFERENCE TO RELATED APPLICATIONS

This application is a National Stage application of PCT/GB2021/050961, filed Apr. 22, 2021, which claims priority to United Kingdom Patent Application No. 2006033.1, filed Apr. 24, 2020, both of which are incorporated by reference in their entirety herein.

FIELD OF THE INVENTION

The present invention relates to fungicidal compositions and to a process for preparing fungicidal compositions and to their use for pest control.

BACKGROUND OF THE INVENTION

Fungicides are specific types of agrochemicals that are used widely to control fungal diseases by inhibiting or killing the fungus causing diseases. 1,2,4-triazole and its derivatives represent one of the most biologically active classes of compounds, possessing a wide spectrum of activities. These triazole fungicides are economically important agrochemicals as they are widely used on crops such as wheat, barley, soybean and orchard fruits and have protective, curative and eradicant properties. A triazole fungicide of particular importance is 2-[2-(1-chlorocyclopropyl)-3-(2-chlorophen-yl)-2-hydroxypropyl]-2, 4-dihydro-[1,2,4-]-trazole-3-thione. The common name for this triazolinthione fungicide is prothioconazole. Prothioconazole is a sterol demethylation (ergosterol biosynthesis) inhibitor and is used in agriculture as a mainly as fungicide.

Various liquid and solid compositions of Prothioconazole are available in the market. Formulating prothioconazole in a suitable form is tricky as it requires extra attention to carefully select ingredients comprising the formulation as well as the process of preparing such formulations.

Solid formulations like water-dispersible granules, or dry flowables are frequently the choice of formulators as they are relatively safer and more commercially attractive alternatives to wettable powders and suspension concentrates. They are becoming more popular because of their convenience in packaging and use, being non-dusty, free-flowing granules, which should disperse quickly when added to water in the spray tank. They therefore represent a technological improvement over wettable powders and imitate liquids in handling characteristics, with the minimum of pack disposal problem.

Granulation, a technique of particle enlargement by agglomeration, is one of the most significant unit operations in the production of most solid formulations like water dispersible granules and dry flowables. During the granulation process, small fine or coarse particles are converted into large agglomerates called granules. Generally, granulation commences after initial dry mixing of the necessary powder ingredients along with the active ingredient (Al), so that a uniform distribution of each ingredient throughout the powder mixture is achieved.

Granules are produced to enhance the uniformity of the active ingredient in the final product, to increase the density of the blend so that it occupies less volume per unit weight for better storage and shipment, to facilitate metering or volumetric dispensing, to reduce dust during granulation process to reduce toxic exposure and process-related hazards, and to improve the appearance of the product. Consequently, the ideal characteristics of granules include, narrow particle size distribution for content uniformity and volumetric dispensing, sufficient fines to fill void spaces between granules for better compaction and compression characteristics, and adequate moisture and hardness to prevent breaking.

In the absence of adequate moisture and hardness, granules become more friable. To those versed in the art and science of granulation, the term friability describes a granule's propensity to crumble. When granules display high friability, they crumble easily. This is not desirable. Highly friable granules are difficult to convey during production and are hard to package and transport. Formulators, reasonably, expect their granules to be unbroken and whole. Further, it has been observed that highly friable granules have poor attrition and contributes to more dustiness. Both are undesirable properties from the formulation development perspective.

Prothioconazole is frequently formulated as liquid and solid compositions. The challenge in developing stable solid prothioconazole composition is the selection of critical ingredients and the right processing that produces granules with optimum friability which can withstand external factors and resist loss of granule integrity. The granules with good attrition resistance and low dustiness so that granular integrity can be maintained after manufacture as well as during transport and storage. Therefore, there is a need to develop stable composition of prothioconazole, especially in the form of solid composition.

OBJECTIVES OF THE INVENTION

An object of the present invention is to provide a stable composition of prothioconazole.

An object of the present invention is to provide a stable solid composition of prothioconazole.

An object of the present invention is to provide a stable composition of prothioconazole having optimal friability and good attrition resistance.

Yet another object of the present invention is to provide a process for preparing a stable composition of prothioconazole.

SUMMARY OF THE INVENTION

In an aspect of the present invention, a stable fungicidal composition comprises:

a) at least one conazole fungicide; and
b) at least one weak acid.

In another aspect, the present invention provides a composition comprising a conazole fungicide, a weak acid and water.

In another aspect of the present invention, a stable fungicidal composition comprises:

a) at least one conazole fungicide;
b) at least one weak acid; and
c) at least one other fungicide selected from a strobilurin fungicide or a pyrazole carboxamide fungicide.

In another aspect of the present invention, a stable fungicidal composition comprises:

a) at least one conazole fungicide;
b) at least one weak acid;
c) at least one other fungicide selected from a strobilurin fungicide or a pyrazole carboxamide fungicide; and
d) water.

In an aspect of the present invention, there is provided a process for preparing a stable fungicidal composition, said process comprising mixing a weak acid with a conazole fungicide.

In an aspect of the present invention, there is provided a process for preparing a stable fungicidal composition, said process comprising mixing a weak acid with water, and adding the mixture of weak acid and water to a conazole fungicide.

In an aspect of the present invention, there is provided a process for preparing a stable fungicidal composition, said process comprising mixing a weak acid with a conazole fungicide, and formulating the mixture to a suitable form using a suitable equipment.

In an aspect of the present invention, there is provided a process for preparing a stable fungicidal composition, said process comprising preparing a blend of conazole fungicide, optionally with other active ingredients or excipients, and mixing a weak acid with the blend comprising the conazole fungicide.

In an aspect of the present invention, a process for preparing stable fungicidal composition comprises:

(a) preparing mixture of weak acid with water;
(b) separately, preparing a blend of conazole fungicide, optionally with other active ingredients or excipients,
(c) adding mixture obtained in step (1) to the blend of step (2); and
(d) formulating to a suitable form using a suitable equipment.

In another aspect of the present invention, a method for controlling pests comprises applying, to an area to be treated, a composition comprising at least one conazole fungicide; and at least one weak acid.

In another aspect of the present invention, there is provided a method for controlling pests, said method comprising applying, to an area to be treated, a composition comprising at least one conazole fungicide; at least one weak acid; and water.

In an aspect of the present invention, provided is the use of a composition comprising at least one conazole fungicide; and at least one weak acid.

In an aspect of the present invention, provided is the use of a composition comprising at least one conazole fungicide; at least one weak acid; and water.

In another aspect of the present invention, there is provided a kit comprising a composition comprising at least one conazole fungicide; and at least one weak acid.

Additional features and advantages of the present invention will be apparent from the detailed description that follows, which illustrates by way of example, the most preferred features of the present invention which are not to be construed as limiting the scope of the invention described herein.

DETAILED DESCRIPTION OF THE INVENTION

Figure 1:
FIG. 1 shows various steps of extrusion process to obtain granules.

During extrusion of prothioconazole granules, friability problem is of major concern. Despite choosing many combinations of surfactants, fillers and process aids, resulting granules were found to be highly friable such that they broke immediately after extrusion. In further trials, extruded granules became too wet such that water oozed out from dough upon extrusion. Such granules when dried after extrusion were found to have inferior attrition resistance and poor dustiness. Surprisingly, inventors of the present invention found that granules with optimum friability can be obtained by incorporating at least one weak acid, optionally with water, with a conazole fungicide used for preparing dough. Such granules prepared using weak acid with water found to have greater attrition resistance and acceptable dustiness level.

Solubility of Prothioconzaole is dependent on pH. Inventors of the present invention observed that upon adjusting the pH of prothioconazole by using a mixture of weak acid and water and then performing granulation of such pH balanced prothioconazole, extruded granules thus obtained possesses optimum friability and passes all quality check. Such adjustment of pH by using a mixture of weak acid with water used for prothioconazole granulation has the surprising benefit of dramatically improving the friability of granules, good attrition resistance and acceptable dustiness.

Therefore, present invention relates to a stable fungicidal composition comprising:

a) at least one conazole fungicide; and
b) at least one weak acid;

According to an embodiment of the present invention, conazole fungicide is selected from the group comprising of Triazole fungicides and Imidazole fungicides, their salts, or esters, or isomers or derivatives thereof.

According to an embodiment of the present invention, triazole fungicides are selected from the group comprises of azaconazole, bromuconazole, cyproconazole, diclobutrazol, difenoconazole, diniconazole, diniconazole-M, epoxiconazole, etaconazole, fenbuconazole, fluconazole, fluquinconazole, flusilazole, flutriafol, furconazole, furconazole-cis, hexaconazole, imibenconazole, ipconazole, ipfentrifluconazole, mefentrifluconazole, metconazole, myclobutanil, penconazole, propiconazole, prothioconazole, quinconazole, simeconazole, tebuconazole, tetraconazole, thiabendazole (triazole), triadimefon, triadimenol, triticonazole, uniconazole and uniconazole-P, their salts, or esters, or isomers or derivatives thereof.

According to an embodiment of the present invention, Imidazole fungicides are selected from the group comprises of climbazole, clotrimazole, imazalil, oxpoconazole, prochloraz and triflumizole, their salts, or esters, or isomers or derivatives thereof.

According to the preferred embodiment of the present invention, conazole fungicides are selected from prothioconazole, cyproconazole, hexaconazole and tebuconazole, their salts, or esters, or isomers or derivatives thereof.

According to the most preferred embodiment of the present invention, conazole fungicide is prothioconazole ((2-(2-(1-chlorocyclopropyl)-3-(2-chlorophenyl)-2-hydroxypropyl)-1,2-dihydro-3H1,2,4-triazole-3-thione), their salts, or esters, or isomers or derivatives thereof.

In an embodiment of the present invention, a stable fungicidal composition comprises from about 0.01% to about 40% w/w and preferably from about 0.1% to about 35% w/w conazole fungicide of the total weight of the stable fungicidal composition; and at least one weak acid.

In a preferred embodiment of the present invention, the stable fungicidal composition comprises from about 1% to about 30% w/w conazole fungicide of the total weight of the stable fungicidal composition; and a weak acid.

According to an embodiment of the present invention, the stable fungicidal composition comprises of at least one weak acid.

According to an embodiment of the present invention, weak acid in the stable fungicidal composition is selected from the group comprising of weak inorganic acids and weak organic acids.

According to an embodiment of the present invention, weak inorganic acid in the stable fungicidal composition is selected from one or more of phosphoric acid, boric acid, citric acid, sulphurous acid, nitrous acid, hydrofluoric acid and the like.

According to an embodiment of the present invention, weak organic acid in the stable fungicidal composition is selected from one or more of oxalic acid, methanoic acid, benzoic acid, fumaric acid, acetic acid, propionic acid, tartaric acid, succinic acid and the like.

According to a preferred embodiment of the present invention, weak inorganic acids in the stable fungicidal composition is selected from one or more of phosphoric acid, boric acid and citric acid.

In an embodiment of the present invention, a stable fungicidal composition comprising from about 0.01% to about 30% w/w and preferably from about 0.1% to about 20% w/w weak acid of the total weight of the stable fungicidal composition.

In a preferred embodiment of the present invention, the stable fungicidal composition comprises from about 1% to about 15% w/w weak acid of the total weight of the stable fungicidal composition.

According to an embodiment of the present invention, the fungicidal composition comprises a) at least one conazole fungicide;

b) at least one weak acid; and c) water.

According to an embodiment of the present invention, the stable fungicidal composition comprises:

a) at least one conazole fungicide;

b) at least one weak acid; and c) at least one other fungicide selected from strobilurin fungicides or pyrazole carboxamide fungicides;

According to an embodiment of the present invention, the stable fungicidal composition comprises:

a) at least one conazole fungicide;

b) at least one weak acid;

c) at least one other fungicide selected from strobilurin fungicides or pyrazole carboxamide fungicides; and d) water.

According to an embodiment of the present invention, at least one other fungicide in the stable fungicidal composition is selected from one or more of strobilurin fungicide or a pyrazole carboxamide fungicide.

According to an embodiment of the present invention, strobilurin fungicide in the stable fungicidal composition is selected from one or more of fluoxastrobin, mandestrobin, pyribencarb, azoxystrobin, bifujunzhi, coumoxystrobin, enoxastrobin, flufenoxystrobin, jiaxiangjunzhi, picoxystrobin, pyraoxystrobin, pyraclostrobin, pyrametostrobin, triclopyricarb, dimoxystrobin, fenaminstrobin, metominostrobin, orysastrobin, kresoxim-methyl and trifloxystrobin.

According to a preferred embodiment of the present invention, strobilurin fungicide in the stable fungicidal composition is selected from one or more of azoxystrobin, kresoxim-methyl, picoxystrobin, pyraclostrobin, and trifloxystrobin.

In an embodiment of the present invention, a stable fungicidal composition comprises from about 0.01% to about 30% w/w and preferably from about 0.1% to about 20% w/w strobilurin fungicide of the total weight of the stable fungicidal composition.

In a preferred embodiment of the present invention, the stable fungicidal composition comprises from about 1% to about 15% w/w strobilurin fungicide of the total weight of the stable fungicidal composition.

According to an embodiment of the present invention, pyrazole carboxamide fungicide in the stable fungicidal composition is selected from one or more of benzovindiflupyr, bixafen, flubeneteram, fluindapyr, fluxapyroxad, furametpyr, inpyrfluxam, isoflucypram, isopyrazam, penflufen, penthiopyrad, pydiflumetofen and sedaxane.

According to a preferred embodiment of the present invention, pyrazole carboxamide fungicide in the stable fungicidal composition is selected from one or more of fluindapyr, fluxapyroxad, penthiopyrad and sedaxane.

In an embodiment of the present invention, a stable fungicidal composition comprises from about 0.01% to about 30% w/w and preferably from about 0.1% to about 20% w/w pyrazole carboxamide fungicide of the total weight of the stable fungicidal composition.

In a preferred embodiment of the present invention, a stable fungicidal composition comprises from about 1% to about 15% w/w pyrazole carboxamide fungicide of the total weight of the stable fungicidal composition.

The stable fungicidal composition of the present invention may further comprise one or more dispersants, wetting agents, fillers, surfactants, anticaking agents, pH-regulating agents, preservatives, biocides, antifoaming agents, colorants and other formulation aids.

The dispersants may be selected from ionic and nonionic dispersants to enable disintegration of granules with water with ease, such as salts of polystyrene sulphonic acids, salts of polyvinylsulphonic acids, salts of naphthalenesulphonic acid/formaldehyde condensates, salts of condensates of naphthalenesulphonic acid, phenolsulphonic acid and formaldehyde, and salts of lignosulphonic acid, polyethylene oxide/polypropylene oxide block copolymers, polyethylene glycol ethers of linear alcohols, reaction products of fatty acids with ethylene oxide and/or propylene oxide, furthermore polyvinyl alcohol, polyvinylpyrrolidone, copolymers of polyvinyl alcohol and polyvinylpyrrolidone and copolymers of (meth)acrylic acid and (meth)acrylic esters, furthermore, taurate surfactants such as sodium methyl cocoyl taurate, sodium methyl lauroyl taurate, sodium methyl myristoyl taurate, sodium methyl oleoyl taurate, sodium methyl palmitoyl taurate and sodium methyl stearoryl taurate. furthermore alkyl ethoxylates and alkylarylethoxylates ethoxylated alkylarylphosphated and sulphated ester or mixtures thereof.

The wetting agents may be selected from soaps; silicone oil, magnesium stearate, salts of aliphatic monoesters of sulphuric acid including but not limited to sodium lauryl sulphate; sulfoakylamides and salts thereof including but not limited to N-methyl-N-oleoyltaurate sodium salt; alkylarylsulfonates including but not limited to akylbenzenesulfonates; akylnaphthalenesulfonates and salts thereof and salts of ligninsulfonic acid.

In an embodiment filler may be selected from insoluble fillers and soluble fillers.

In an embodiment, fillers may be selected preferably from precipitated silica, clay, lactose monohydrate and diatomaceous earth kaolin.

The stable fungicidal composition of the present invention is preferably formulated as a solid composition including, but not limited to, granules, dust, powder, pellets, tablets, dry flowable, Wettable powder or water dispersible granules.

In a preferred embodiment, the stable fungicidal composition of the present invention is a Water Dispersible Granules (WDG) formulation comprising a conazole fungicide and a weak acid.

In a preferred feature, the stable fungicidal composition of the present invention is an extrusion granulated formulation comprising a conazole fungicide and a weak acid.

In an embodiment, suitable antifoams may, preferably be, silicones, long-chain alcohols and salts of fatty acids.

Suitable colorants (for example in red, blue and green) are, preferably, pigments, which are sparingly soluble with water, and dyes, which are water-soluble. Examples are inorganic coloring agents (for example iron oxide, titanium oxide, and iron hexacyanoferrate) and organic coloring agents (for example alizarin, azo and phthalocyanin coloring agents).

In an embodiment, the present invention provides a stable fungicidal composition comprising from about 0.1% to about 40% w/w conazole fungicide and from about 0.1% to about 30% w/w weak acid.

In an embodiment, the present invention provides a stable fungicidal composition comprising from about 0.1% to about 40% w/w conazole fungicide, from about 0.1% to about 30% w/w weak acid mixture with water of the total weight of the stable fungicidal composition.

In an embodiment, the present invention provides a stable fungicidal composition comprising from about 1% to about 35% w/w conazole fungicide, from about 1% to about 20% w/w weak acid mixture with water of the total weight of the stable fungicidal composition.

In a preferred embodiment, the present invention provides a stable fungicidal composition comprising from about 5% to about 30% w/w prothioconazole, from about 5% to about 20% w/w citric acid mixture with water of the total weight of the stable fungicidal composition.

In an embodiment, the present invention provides a stable fungicidal composition comprising from about 1% to about 40% w/w conazole fungicide, from about 1% to about 50% w/w pyrazole carboxamide fungicide, from about 1% to about 20% w/w weak acid mixture with water of the stable fungicidal composition.

In a preferred embodiment, the present invention provides a stable fungicidal composition comprising from about 1% to about 40% w/w prothioconazole, from about 1% to about 50% w/w fluindapyr, from about 1% to about 20% w/w phosphoric acid mixture with water of the total weight of the stable fungicidal composition.

In an embodiment, the present invention provides a stable fungicidal composition comprising from about 1% to about 40% w/w conazole fungicide, from about 1% to about 50% w/w strobilurin fungicide, from about 1% to about 20% w/w weak acid mixture with water of the total weight of the stable fungicidal composition.

In a preferred embodiment, the present invention provides a stable fungicidal composition comprising from about 1% to about 40% w/w prothioconazole, from about 10% to about 50% w/w azoxystrobin and from about 1% to about 20% w/w phosphoric acid mixture with water of the total weight of the stable fungicidal composition.

In an embodiment, the present invention provides a stable fungicidal composition comprising from about 1% to about 40% w/w prothioconazole, from about 10% to about 50% w/w azoxystrobin, from about 10% to about 50% w/w fluindapyr and from about 1% to about 20% w/w oxalic acid mixture with water of the total weight of the stable fungicidal composition.

In a preferred embodiment, the present invention provides a stable fungicidal composition comprising from about 1% to about 40% w/w prothioconazole, from about 10% to about 50% w/w azoxystrobin, from about 10% to about 50% w/w cyproconazole and from about 1% to about 20% w/w phosphoric acid mixture with water of the total weight of the stable fungicidal composition.

In a preferred feature, the composition comprises prothioconazole in an amount that is greater than about 0.80% by weight of the composition.

In a preferred feature, the composition of the invention is substantially free of the insecticide cartap or a salt thereof.

In a preferred feature, the composition of the invention is substantially free of the fungicide tricyclazole.

In a preferred feature, the composition of the invention is in the form of an extruded granular formulation.

In a preferred feature, the composition of the invention is not an encapsulated granular formulation.

According to an embodiment of the present invention, a process for preparing a stable fungicidal composition comprises mixing a weak acid with a conazole fungicide.

According to an embodiment of the present invention, a process for preparing a stable fungicidal composition comprises mixing a weak acid with water and adding the mixture of weak acid and water to a conazole fungicide.

According to an embodiment of the present invention, weak acid is mixed with water prior to its incorporation with conazole fungicide to obtain said stable fungicidal composition.

According to an embodiment of the present invention, the process for preparing a stable fungicidal composition comprises mixing a weak acid with a conazole fungicide and formulating the mixture to a suitable form using a suitable equipment.

According to an embodiment of the present invention, in the process of preparing the stable fungicidal composition comprises preparing mixture of weak acid with water and formulating the mixture with a conazole fungicide.

According to an embodiment of the present invention, in the process of preparing the stable fungicidal composition, while preparing mixture of weak acid with water, weak acid is either dissolved or dispersed with water to obtain either a solution or dispersion.

According to an embodiment of the present invention, conazole fungicide is separately mixed with other agrochemical ingredients or excipients to obtain blend. The blend thus obtained is then allowed to mix the mixture of weak acid with water.

According to an embodiment of the present invention, a process for preparing a stable fungicidal composition comprises mixing a weak acid with a conazole fungicide and obtaining fungicidal composition in the form of WDG by way of extrusion.

According to an embodiment of the present invention, a process for preparing stable fungicidal composition comprises preparing a blend of conazole fungicide, optionally with other active ingredients or excipients, and mixing a weak acid with the blend comprising the conazole fungicide.

According to an embodiment of the present invention, a process for preparing stable fungicidal composition comprises steps of:

(a) preparing mixture of weak acid with water;

(b) separately, preparing a blend of conazole fungicide, optionally with other active ingredients or excipients, (c) adding mixture obtained in step (1) to the blend of step (2); and (d) formulating to a suitable form using a suitable equipment.

According to an embodiment of the present invention, there is provided a process for preparing a stable fungicidal composition, said process comprises:

(a) homogenizing active ingredients and optionally other inert ingredients to obtain blend;

(b) separately, preparing mixture of weak acid with water;

(c) allowing blend of step (1) to mix with mixture of step (2); and (d) formulating to a suitable form using a suitable equipment.

According to an embodiment of the present invention, a process for preparing a stable fungicidal composition comprises:

(a) homogenizing active ingredients and optionally other inert ingredients to obtain blend;

(b) separately, preparing mixture of weak acid with water;

(c) allowing blend of step (1) to mix with mixture of step (2) to obtain dough;

(d) extruding the dough of step (3) to obtain granules; and (e) drying the granules to remove moisture <1% and packing in suitable packaging.

According to an embodiment of the present invention, a process for preparing a stable fungicidal composition comprises:

(a) homogenizing prothioconazole and optionally other inert ingredients to obtain blend;

(b) separately, preparing mixture of phosphoric acid with water;

(c) allowing blend of step (1) to mix with mixture of step (2) to obtain dough;

(d) extruding the dough of step (3) to obtain granules; and (e) drying the granules to remove moisture <1% and packing in suitable packaging.

According to an embodiment of the present invention, the process for preparing a stable fungicidal composition, said process comprising mixing a weak acid with a conazole fungicide and obtaining fungicidal composition in the form of WDG by way of extrusion.

According to an embodiment of the present invention, the process for preparing stable fungicidal composition, said process comprising preparing a blend of conazole fungicide, optionally with other active ingredients or excipients, and mixing a weak acid with the blend.

According to an embodiment of the present invention, there is provided a process for preparing a stable fungicidal composition, said process comprises:

(a) homogenizing active ingredients and optionally other inert ingredients to obtain blend;

(b) separately, preparing mixture of weak acid with water;

(c) allowing blend of step (1) to mix with mixture of step (2); and (d) formulating to a suitable form using a suitable equipment.

According to an embodiment of the present invention, a process for preparing a stable fungicidal composition comprises:

(a) homogenizing active ingredients and optionally other inert ingredients to obtain blend;

(b) separately, preparing mixture of weak acid with water;

(c) allowing blend of step (1) to mix with mixture of step (2) to obtain dough;

(d) extruding the dough of step (3) to obtain granules; and (e) drying the granules to remove moisture <1% and packing in suitable packaging.

According to an embodiment of the present invention, a process for preparing a stable fungicidal composition said process comprises:

(a) homogenizing prothioconazole and optionally other inert ingredients to obtain blend;

(b) separately, preparing mixture of phosphoric acid with water;

(c) allowing blend of step (1) to mix with mixture of step (2) to obtain dough;

(d) extruding the dough of step (3) to obtain granules; and (e) drying the granules to remove moisture <1% and packing in suitable packaging.

According to an embodiment of the present invention, the order of addition and mixing of the agrochemical ingredients or excipients is not narrowly critical. In one embodiment, for example, the dry ingredients are blended, and the composition is then mixed with the mixture of water and weak acid.

According to an embodiment of the present invention, mixture of weak acid with water may be added as a fine spray to prepare dough from the composition to obtain granules.

According to an embodiment of the present invention, the blend of above ingredients is obtained using a suitable blender such as ribbon blender, V-blender, high intensity low mixer or the like.

According to an embodiment of the present invention, blend of conazole fungicide along with agrochemical excipients may be taken for milling to obtain uniform blend.

The grinding may be performed in a suitable device such as air jet mill, air classifier mill, hammer mill, pin disc mill or the like. Jet mills are shear or pulverizing machines in which the particles to be milled are accelerated by gas flows and pulverized by collision. There are number of different types of jet mill designs, such as double counterflow (opposing jet) and spiral (pancake) fluid energy mills.

According to an embodiment of the present invention, water dispersible granules are normally made through an extrusion process or pan granulation process.

According to an embodiment of the present invention, drying of granules may be performed in a suitable drying equipment such as spray drier or fluidized bed spray drier or fluid bed spray granulator.

According to an embodiment of the present invention, the drying of extruded granules operates at a temperature not more than 50° C.-80° C.

According to preferred embodiment of the present invention, the drying of granules operates at a temperature range of 60° C.-70° C.

The drying process will preferably remove as much water as possible in order to reduce weight and to provide good stability to the granules while still in a dry flowable state. Preferably the granules will be dried to less than 2% as weight loss on complete drying and most preferably dried to less than 1% as weight loss on complete drying.

According to an embodiment of the present invention, materials used in the process of the invention may be in a finely divided form, preferably in an air-milled form which is generally the form of commercial grade chemicals supplied by manufacturers.

After thorough mixing or after otherwise putting the mix into a form suitable for extrusion, extrusion takes place through suitable orifices. The size of the granules will depend upon the size of the orifices and the extruder may thus be fitted with a mesh or die selected to provide a desired size of granule.

Preferably extrusion orifices are chosen to provide extrusions between 800 and 1200 microns in diameter. The extrusions can vary considerably in length, e.g. up to 0.5 cm or more long.

In an embodiment of the present invention, pH of the stable fungicidal composition is adjusted between 4 to 7.

It will be evident to those skilled in the art that one significant advantage of the process of the present invention is that the extrusions are not reduced (e.g. by cutting) to granules as they exit the extruder. This means that the rate of extrusion is not limited by the rate at which the extrusions can be broken down into granules and high extrusion rates can be used. This results in the process of the present invention being significantly more cost-effective than prior art extrusion processes for producing water dispersible granules.

The process of the invention considerably reduces the amount of oversized and undersized material which must be recycled. Consequently, the granule composition is essentially dust free.

According to an embodiment of the present invention, a method for controlling pests comprises applying, to an area to be treated, a composition comprising at least one conazole fungicide; and a weak acid.

In another aspect of the present invention, a method for controlling pests comprises applying, to an area to be treated, a composition comprising at least one conazole fungicide wherein conazole fungicide is prothioconazole; and a weak acid.

According to an embodiment of the present invention, the method for controlling pests comprises applying, to an area to be treated, a composition comprising at least one conazole fungicide; a weak acid; and water.

According to an embodiment of the present invention, provided is the use of a composition comprises at least one conazole fungicide; and a weak acid.

According to an embodiment of the present invention, provided is the use of a composition comprises at least one conazole fungicide wherein conazole fungicide is prothioconazole; and a weak acid.

According to an embodiment of the present invention, provided is the use of a composition comprises at least one conazole fungicide; a weak acid; and water.

According to an embodiment of the present invention, stable fungicidal composition comprises at least one conazole fungicide; and a weak acid; wherein said stable fungicidal composition is used as a pesticide.

According to an embodiment of the present invention, the stable fungicidal composition is especially important for controlling a large number of fungi in a variety of crop plants, such as cotton, vegetable species (for example cucumbers, beans, tomatoes, potatoes and cucurbits), barley, grass, oats, bananas, coffee, corn, fruit species, rice, rye, soya, grapevine, wheat, dry beans, ornamentals, sugarcane, and a large number of seeds.

According to an embodiment of the present invention, stable fungicidal composition is suitable for controlling the following phytopathogenic fungi: *Blumeria graminis* (powdery mildew) in cereals, *Erysiphe cichoracearum* and *Sphaerotheca fuliginea* in cucurbits, *Podosphaera leucotricha* in apples, *Uncinula necator* in grapevines, *Puccinia* species in cereals, *Rhizoctonia* species in cotton, rice and lawns, *Ustilago* species in cereals and sugar cane, *Venturia inaequalis* (scab) in apples, *Helminthosporium* species in cereals, *Septoria nodorum* in wheat, *Botrytis cinera* (gray mold) in strawberries, vegetables, ornamentals and grapevines, *Cercospora arachidicola* in groundnuts, *Pseudocercosporella herpotrichoides* in wheat and barley, *Pyricularia oryzae* in rice, *Phytophthora infestans* in potatoes and tomatoes, Plasmopara viticola in grapevines, *Pseudoperonospora* species in hops and cucumbers, *Alternaria* species in vegetables and fruit, *Mycosphaerella* species in bananas and also *Fusarium* and *Verticillium* species.

According to an embodiment of the present invention, stable fungicidal composition is used in soybean against target spot (*Corynespora cassiicola*), in cotton against ramularia (ramularia areola), anthracnose (*colletotrichum gossypii*), in corn against rust (*Puccinia polysora*), *cercospora* (*Cercospora zeae-maydis*), in wheat against rust (*puccinia triticina*), in powdery mildew against *blumeria graminis*, foliar leaf spots (*drechslera tritici repentis*), in dry bean against angular leaf spot (*phaeoisariopsis griseola*) and anthracnose (*colletotrichum lindemuthianum*).

According to an embodiment of the present invention, there is provided a kit comprising a composition comprising at least one conazole fungicide; and a weak acid.

According to an embodiment of the present invention, the various components of the stable fungicidal composition can be used individually or already partially or completely mixed with one another to prepare the composition according to the invention. It is also possible for them to be packaged and used further as combination composition such as a kit of parts.

In one embodiment of the invention, the kits may include one or more, including all, components that may be used to prepare stable fungicidal composition. E.g., kits may include active ingredients and/or weak acid. One or more of the components may already be combined together or pre-formulated. In those embodiments where more than two components are provided in a kit, the components may already be combined together and as such are packaged in a single container such as a vial, bottle, can, pouch, bag or canister.

It will be understood that the specification and examples are illustrative but not limitative of the present invention and that other embodiments within the spirit and scope of the invention will suggest themselves to those skilled in the art. Other embodiments can be practiced that are also within the scope of the present invention. The following examples illustrate the invention, but by no means intend to limit the scope of the claims.

EXAMPLES

Example 1: Prothioconazole 233 g/kg WDG

| Ingredients | Quantity (% w/w) |
|---|---|
| Prothioconazole | 23.3 |
| Kaolin Clay | 46.6 |
| Sodium lignosulfonate | 14.5 |
| Antifoam | 2.0 |
| Phosphoric Acid | 3.0 |
| Lactose Monohydrate | q.s. |
| Total | 100 |

23.3 g prothioconazole, 46.6 g kaolin clay, 14.5 g sodium lignosulfonate, 1.0 g silicone defoamer and 10.6 g lactose monohydrate were mixed together and homogenized in an ultra-centrifuge to obtain powder. The powder was then air milled until a d(0.9)<7 μm is reached. Separately, phosphoric acid solution was then prepared with tap water by mixing 3.0 g phosphoric acid to obtain 85% solution. Whilst the milled powder was being mixed in a ribbon blender, the phosphoric acid solution was spray applied taking as long as feasible to fully apply to ensure the powder is fully wetted to obtain dough. The dough that was formed was allowed to mix for a short while longer (no more than 30 minutes) before extrusion can begin. The doughs were extruded using a basket extruder with a 1.0 mm screen size. Once extruded, the granules were dried in a fluid bed drier at 60° C. until the moisture content of the granules is <1%.

Examples 2-5: Prothioconazole 233 g/kg WDG

| #. | Ingredients | Example-2 (% w/w) | Example-3 (% w/w) | Example-4 (% w/w) | Example-5 (% w/w) |
|---|---|---|---|---|---|
| 1 | Prothioconazole content | 23.3 | 23.3 | 23.3 | 23.3 |
| 2 | Sodium lignosulfonate | 4.0 | 4.0 | 4.0 | — |
| 3 | Antifoam/Defoamer | 2.0 | 2.0 | 2.0 | 2.0 |
| 4 | Phosphoric acid (85% solution) | 3.0 | — | — | — |
| 5 | Oxalic acid (85% solution) | — | 3.0 | — | — |
| 6 | Citric acid (85% solution) | — | — | 3.0 | — |
| 7 | Tartaric acid (85% solution) | — | — | — | 3.0 |
| 8 | Kaolin clay | 46.6 | — | — | 46.6 |
| 9 | Attapulgite clay | — | — | 46.6 | — |
| 10 | Precipitated silica | — | 46.6 | — | — |
| 11 | Lactose monohydrate | Q.S. | Q.S. | — | Q.S. |
| 12 | Anhydrous lactose | — | — | Q.S. | — |

Example 6: Prothioconazole 233 g/kg WDG

| Ingredients | Quantity (% w/w) |
|---|---|
| Prothioconazole | 23.3 |
| Precipitated Silica | 46.6 |
| sodium polycarboxylate | 14.5 |
| Antifoam | 2.0 |
| Oxalic Acid | 3.0 |
| Lactose Monohydrate | q.s. |
| Total | 100 |

Prothioconazole, kaolin clay, sodium polycarboxylate, defoamer, silicone antifoam, oxalic acid solution and lactose monohydrate were mixed in above quantity and processed as per the process given in Example-1 to obtain stable fungicidal composition as water dispersible granules.

Example 7: Prothioconazole 233 g/kg WDG

| Ingredients | Quantity (% w/w) |
|---|---|
| Prothioconazole | 23.3 |
| Attapulgite clay | 46.6 |
| Sodium lauryl sulfate | 12.0 |

-continued

| Ingredients | Quantity (% w/w) |
|---|---|
| Antifoam | 2.0 |
| Citric acid solution | 3.0 |
| Anhydrous lactose | q.s |
| Total | 100 |

Prothioconazole, attapulgite clay, sodium lauryl sulfate, defoamer, silicone antifoam, citric acid solution and anhydrous lactose were mixed in above quantity and processed as per the process given in Example-1 to obtain stable fungicidal composition as water dispersible granules.

Example 8: Prothioconazole 233 g/kg WDG

| Ingredients | Quantity (% w/w) |
|---|---|
| Prothioconazole | 23.3 |
| Kaolin Clay | 46.6 |
| sodium polycarboxylate | 12.5 |
| Antifoam | 2.0 |
| Tartaric acid solution | 3.0 |
| Lactose Monohydrate | q.s. |
| Total | 100 |

Prothioconazole, kaolin clay, sodium polycarboxylate defoamer, silicone antifoam, tartaric acid solution and lactose monohydrate were mixed in above quantity and processed as per the process given in Example-1 to obtain stable fungicidal composition as water dispersible granules.

Example 9: Prothioconazole 233 g/Kg+Fluindapyr 233 g/kg WDG

| Ingredients | Quantity (% w/w) |
|---|---|
| Prothioconazole | 23.3 |
| Fluindapyr | 23.3 |
| Kaolin Clay | 23.3 |
| Sodium lignosulfonate | 14.5 |
| Antifoam | 2.0 |
| Phosphoric Acid solution | 3.0 |
| Lactose Monohydrate | q.s. |
| Total | 100 |

Prothioconazole, fluindapyr, kaolin clay, sodium lignosulfonate defoamer, silicone antifoam, phosphoric acid (85% solution) and lactose monohydrate were mixed in above quantity and processed as per the process given in Example-1 to obtain stable fungicidal composition as water dispersible granules.

Example 10: Prothioconazole 233 g/Kg+Cyproconazole 233 g/kg WDG

| Ingredients | Quantity (% w/w) |
|---|---|
| Prothioconazole | 23.3 |
| Cyproconazole | 23.3 |
| Precipitated silica | 23.3 |

-continued

| Ingredients | Quantity (% w/w) |
|---|---|
| Sodium polycarboxylate | 14.5 |
| Antifoam | 2.0 |
| Citric Acid solution | 3.0 |
| Lactose Monohydrate | q.s. |
| Total | 100 |

Prothioconazole, cyproconazole, precipitated silica, sodium polycarboxylate, defoamer, silicone antifoam, citric acid (85% solution) and lactose monohydrate were mixed in above quantity and processed as per the process given in Example-1 to obtain stable fungicidal composition as water dispersible granules.

Example 11: Prothioconazole 233 g/Kg+Azoxystrobin 233 g/kg WDG

| Ingredients | Quantity (% w/w) |
|---|---|
| Prothioconazole | 23.3 |
| Azoxystrobin | 23.3 |
| Kaolin Clay | 23.3 |
| Alkyl naphthalene sulfonate | 14.5 |
| Antifoam | 2.0 |
| Phosphoric Acid | 3.0 |
| Lactose Monohydrate | q.s. |
| Total | 100 |

Prothioconazole, azoxystrobin, kaolin clay alkyl naphthalene sulfonate, defoamer, silicone antifoam, phosphoric acid solution and lactose monohydrate were mixed in above quantity and processed as per the process given in Example-1 to obtain stable fungicidal composition as water dispersible granules.

Example 12: Prothioconazole 233+Fluindapyr 233+Cyproconazole 233 g/Kg WDG

| Ingredients | Quantity (% w/w) |
|---|---|
| Prothioconazole | 23.3 |
| Fluindapyr | 23.3 |
| Cyproconazole | 23.3 |
| sodium lauryl sulfate | 14.5 |
| Antifoam | 2.0 |
| Phosphoric Acid solution | 3.0 |
| Lactose Monohydrate | q.s. |
| Total | 100 |

Prothioconazole, fluindapyr, cyproconazole, sodium lauryl sulfate, defoamer, silicone antifoam, phosphoric acid solution and lactose monohydrate were mixed in above quantity and processed as per the process given in Example-1 to obtain stable fungicidal composition as water dispersible granules.

Example 13: Prothioconazole 233+Fluindapyr 233+Azoxystrobin 233 g/Kg WDG

| Ingredients | Quantity (% w/w) |
|---|---|
| Prothioconazole | 23.3 |
| Fluindapyr | 23.3 |
| Azoxystrobin | 23.3 |
| Sodium lignosulfonate | 14.5 |
| Antifoam | 2.0 |
| Phosphoric Acid solution | 3.0 |
| Lactose Monohydrate | q.s. |
| Total | 100 |

Prothioconazole, fluindapyr, azoxystrobin, sodium lignosulfonate, defoamer, silicone antifoam, phosphoric acid solution and lactose monohydrate were mixed in above quantity and processed as per the process given in Example-1 to obtain stable fungicidal composition as water dispersible granules.

Example 14: Prothioconazole 233 g/kg WDG [Comparative Example)

| Ingredients | Quantity (% w/w) |
|---|---|
| Prothioconazole | 23.3 |
| Kaolin Clay | 49.6 |
| Sodium lignosulfonate | 14.5 |
| Antifoam | 2.0 |
| Lactose Monohydrate | q.s. |
| Total | 100 |

Example 15: Prothioconazole 233 g/kg WDG [Comparative Example)

| Ingredients | Quantity (% w/w) |
|---|---|
| Prothioconazole | 23.3 |
| Kaolin Clay | 46.6 |
| Sodium lignosulfonate | 4 |
| Antifoam | 2.0 |
| Lactose Monohydrate | q.s. |
| Total | 100 |

Stability Data

The WDG compositions prepared according to the present invention were investigated for degradation of active ingredient, suspensibility, wet sieve retention, attrition resistance, dust content and friability as well as its effect on stability of the composition (Table 1).

Compositions of Example 2-5 found to be stable with less than 10% degradation noticed in 14 AHS. Suspensibility of the compositions of Example 2-5 found to be more than 60% in both ambient and 14 days AHS conditions. All the compositions of Example 2-5 found to be nearly dust free in both ambient and 14 days AHS conditions.

Attrition resistance of granules was measured as per MT 178 method wherein prior to the test, the granules of each compositions of Example-2 were sieved on a 125 micron sieve in order to remove fine particles. A known amount of this dust-free granules were transferred to a glass bottle and is then subjected to a rolling movement with an equal amount of glass beads. After rolling for a specified period, the attrition resistance is determined by sieving again on a 125 micron sieve and weighing the material retained on the sieve. Similar procedure was followed for compositions of Example 3, 4 and 5. All the compositions of Example 2-5 found to have good attrition resistance above 40%.

TABLE 1

| # | Ingredients | Example-2 | Example-3 | Example-4 | Example-5 |
|---|---|---|---|---|---|
| 1 | Active content degradation (after 14 days AHS) (% w/w) | 5-6 | 8-9 | 7-8 | 7-8 |
| 2 | Suspensibility (0 day/after 14 days AHS) % w/w | 90/94 | 75/70 | 70/74 | 65/68 |
| 3 | Wet sieve retention (0 day/after14 days AHS) % w/w | <0.1/<0.1 | 0.1/0.1 | 0.3/0.3 | 0.3/0.4 |
| 4 | Attrition resistance (retention 125 micron sieve test) % w/w | 70 | 40 | 65 | 60 |
| 5 | Dust content | Nearly dust free | Essentially non dusty | Nearly dust free | Nearly dust free |
| 6 | Friability test- as Resistance (based on dry sieve retention on 100 micron sieve) % w/w | 65 | 50 | 63 | 59 |

Further, compositions of Example-12 and Example-13 were also tested for suspensibility and wet sieve retention (Table 2). A remarkable suspensibility of >90% observed in the composition at 0 days testing. Also, both the compositions qualified wet sieve retention test when passed through 45 μm sieve.

TABLE 2

| | Observations at 0 days | |
|---|---|---|
| Stability Parameters | Example-12 | Example-13 |
| Suspensibility | >90% | >90% |
| Wet sieve (45 μm sieve) | 0.3% | 0.0% |

The compositions of Example-12 and Example-13 were kept at 54±2° C. for up to 14 days and stability parameters such as suspensibility, wet sieve analysis and degradation of active ingredients were tested. The results are summarized in Table 3. As clear from Table 3, degradation of active(s) prothioconazole, cyproconazole, fluindapyr and azoxystrobin in WDG composition was not observed when kept at 54±2° C. for 14 days.

TABLE 3

| | Example 12 | | Example 13 | |
|---|---|---|---|---|
| Physico/chemical property | 0 days | 14 days (AHS) | 0 days | 14 days |
| % degradation Prothioconazole | 0% | 0% | 0% | 0% |
| % degradation Fluindapyr | 0% | 0% | 0% | 0% |
| % degradation Azoxystrobin | N/A | N/A | 0% | 0% |
| % degradation Cyproconazole | 0% | 0% | N/A | N/A |

Comparative Study to Understand Role of Weak Acid

Figure 2A:
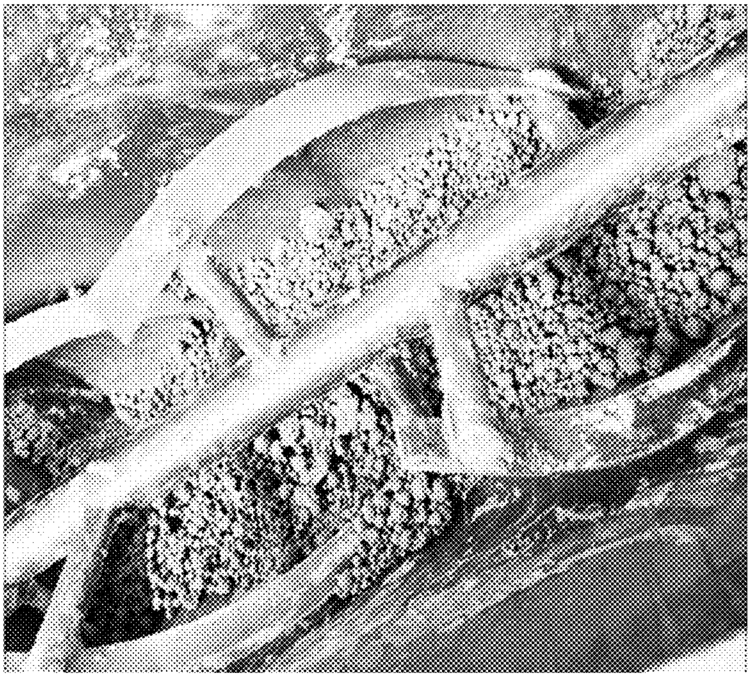
FIGS. 2A and 2B shows comparative images of dough prepared by incorporating weak acid and without weak acid respectively.
Figure 2B:

While preparing WDG formulation of prothioconazole by extrusion process, inventors of the present invention faced problem at the very initial stage of granulation, i.e. at the dough making step. When weak acid was not incorporated into the composition, a wet dough was obtained which gradually became more wetter upon keeping for some time before extrusion. The dough was too sticky and cohesive and could not process further for extrusion. FIG. 2A shows proper dough prepared according to the composition of Example-1 and FIG. 2B shows sticky & wet obtained according to the composition of Example-14. Composition of Example-15 was also prepared according to the process of present invention without adding weak acid. After several efforts, granules were extruded but found to be very friable and broke during handling. Even suspensibility found to be around 40% at 0 days and 34% in 14 days AHS. 15-19% prothioconazole degradation was observed. (Table 4)

TABLE-4

| # | Parameters | Values |
|---|---|---|
| A | Active content degradation (after 14 days AHS) (% w/w) | 15-19 |
| B | Suspensibility (0 day/after 14 days AHS) % w/w | 40/34 |
| C | Wet sieve retention (0 day/after 14 days AHS) % w/w | 0.9/1.5 |
| D | Attrition resistance (retention 125 micron sieve test) % w/w | 20 |
| E | Dust content | Dusty |
| F | Friability test- as Resistance (based on dry sieve retention on 100 micron sieve) % w/w | 12 |

Inventors of the present invention thus successfully prepared stable fungicidal composition of conazole fungicide as well as in combination with other agrochemically active ingredients using mixture of weak acid with water. The granular composition according to the invention exhibited outstanding attrition resistance, excellent dispersion stability after accelerated aging, good friability and dustiness. The granular composition of the present invention remains intact and does not lose the granule integrity while manufacturing and during storage. The composition described above found to be stable.

We claim:

1. A stable fungicidal composition comprising: a) at least one conazole fungicide selected from the group consisting of prothioconazole, tebuconazole, cyproconazole, hexaconazole, their salts, esters, isomers, and combinations thereof; and b) at least one weak acid selected from the group consisting of weak organic acids and weak inorganic acids, wherein the weak inorganic acid is selected from one or more of phosphoric acid, boric acid, citric acid, sulphurous acid, nitrous acid and hydrofluoric acid, the weak organic acid is selected from one or more of oxalic acid, methanoic acid, benzoic acid, acetic acid, propionic acid, tartaric acid, and succinic acid, the stable fungicidal composition comprises from about 0.1% to about 40% w/w of the conazole fungicide, from about 0.1% to about 30% w/w of the weak acid mixed with water, based on the total weight of the stable fungicidal composition, and the stable fungicidal composition is in the form of WDGs.

2. The stable fungicidal composition as claimed in claim 1, wherein the conazole fungicide is prothioconazole.

3. The stable fungicidal composition as claimed in claim 1, further comprising c) at least one other fungicide selected from strobilurin fungicides and pyrazole carboxamide fungicides.

4. The stable fungicidal composition as claimed in claim 3, wherein the strobilurin fungicide is selected from one or more of fluoxastrobin, pyribencarb, azoxystrobin, enoxastrobin, flufenoxystrobin, picoxystrobin, pyraoxystrobin, pyraclostrobin, triclopyricarb, metominostrobin, kresoxim-methyl, trifloxystrobin, triflumizole, their salts, esters, isomers and derivatives thereof.

5. The stable fungicidal composition as claimed in claim 3, wherein the pyrazole carboxamide fungicide is selected from one or more of benzovindiflupyr, bixafen, fluindapyr, fluxapyroxad, isopyrazam, penflufen, penthiopyrad, and sedaxane.

6. The stable fungicidal composition as claimed in claim 1, further comprising from about 0.1% to about 40% of the at least one other fungicide based on the total weight of the fungicidal composition.

7. A process for preparing a stable fungicidal composition comprising mixing a weak acid with a conazole fungicide, wherein the stable fungicidal composition comprises from about 0.1% to about 40% w/w of the conazole fungicide, from about 0.1% to about 30% w/w of the weak acid mixed with water, based on the total weight of the stable fungicidal composition, and the stable fungicidal composition is in the form of WDGs.

8. The process as claimed in claim 7, wherein said process comprises mixing the weak acid with water and adding the mixture of weak acid and water to the conazole fungicide.

9. The process for preparing stable fungicidal composition as claimed in claim 7, wherein said process comprises (a) homogenizing the conazole fungicide and optionally other inert ingredients to obtain a blend;

(b) separately, preparing mixture of weak acid with water;

(c) allowing blend of step (1) to mix with mixture of step (2) to obtain a dough;

(d) extruding the dough of step (3) to obtain granules; and (e) drying the granules to remove moisture <1% to obtain said fungicidal composition.

10. The process for preparing stable fungicidal composition as claimed in claim 9, wherein drying of said composition is carried at a temperature not more than 50° C.-80° C.

11. A method for controlling pests, said method comprises applying, to an area to be treated the composition of claim 1.

* * * * *